United States Patent Office 3,357,805
Patented Dec. 12, 1967

3,357,805
PROCESS FOR PREPARING $P_3NCl_{12}$
Margot Becke, Heidelberg, and Wendel Lehr, Schifferstadt, Germany, assignors to Olin Mathieson Chemical Corporation, a corporation of Virginia
No Drawing. Filed Nov. 29, 1962, Ser. No. 241,017
3 Claims. (Cl. 23—357)

ABSTRACT OF THE DISCLOSURE $P_3NCl_{12}$, a known compound of known utility, is prepared by reacting suitable proportions of $PCl_3$ and $NCl_3$ in an inert solvent at temperatures of $-60$ to $+140°$ C.

This invention relates to an improved process for the preparation of $P_3NCl_{12}$. This is a known compound and has previously been prepared as described by M. Becke-Goehring and Lehr, Ber. 94, 1591 (1961) and by M. Becke-Goehring and E. Fluck, Z. angew. Chem. 74, 383 (1962). $P_3NCl_{12}$ has the structural formula:

$$(Cl_3P:N.PCl_3)PCl_6$$

The $P_3NCl_{12}$ is prepared according to the present invention by the reaction of $NCl_3$ (nitrogentrichloride) and $PCl_3$. The $NCl_3$ reactant is prepared in known manner usually in dilute solution in an inert halogenated organic solvent, for example, carbon tetrachloride, chloroform or tetrachloroethane. The $NCl_3$ solution is preferably prepared so as to be free of elemental chlorine.

In the present invention the process appears to be represented by the equation:

$$NCl_3 + 3PCl_3 \rightarrow (Cl_3P:N.PCl_3)PCl_6$$

In the process of the invention, the molar ratio of $PCl_3$ to $NCl_3$ is preferably stoichiometric as required by the above equation but this ratio may slightly exceed 3:1 by up to about 10 percent, that is, the ratio may be up to about 3.3:1. If the $NCl_3$ solution contains elemental chlorine, sufficient additional $PCl_3$ is suitably used in order to react with the chlorine and convert it to $PCl_5$.

Preferred solvents for the reaction include symmetrical tetrachloroethane, carbon tetrachloride and chloroform. However, other inert solvents which may be used include polyhalogenated lower alkanes, for example, bromoform and chlorofluoro-lower alkanes. Preferably the concentration of the reagents does not exceed about 2-molar.

The method of the invention is carried out by mixing the reactants preferably dissolved in an inert solvent at a temperature of about $-60$ to $+140°$ C. but preferably below room temperature. At the higher temperatures the reaction is extremely vigorous and must be carried out cautiously to avoid explosions. Hence temperatures below about 20° C. are preferred. At $-20$ to $-60°$ C. the reaction is easily carried out with safety. The product is recovered by distilling off the solvent and crystallizing the residue, especially advantageously from sym-tetrachloroethane in which it has a limited solubility.

Example I

A solution of 0.15 mole of $PCl_3$ in 100 ml. of sym-tetrachloroethane was added in a series of slow drops to a well-stirred solution of 0.05 mole of $NCl_3$ in 50 ml. of chloroform. The reaction mixture was maintained at $-50°$ C. and moisture was strictly excluded. A colorless precipitate separated. The supernatant solution became colorless and the reaction was complete. The precipitate was filtered (excluding moisture) and recrystallized from sym-tetrachloroethane. The resulting $P_3NCl_{12}$ amounted to 24.5 grams or 92 percent of theory. The properties were identical with those described in the literature.

What is claimed is:
1. Process for preparing $P_3NCl_{12}$ comprising mixing $PCl_3$ with $NCl_3$ in a molar ratio of from 3:1 to 3.3:1, said $PCl_3$ in a first inert polyhalo-lower alkane solvent and said $NCl_3$ in a second inert polyhalo-lower alkane solvent at a temperature of $-60$ to $+140°$ C. and separating the $P_3NCl_{12}$ from the resultant mixture.
2. Process of claim 1 in which said first inert solvent is a polyhalo-lower alkane different from said second inert polyhalo-lower alkane.
3. Process of claim 2 in which the $PCl_3$ is dissolved in tetrachloroethane and added to a solution of $NCl_3$ in chloroform at a temperature between $-60°$ C. and room temperature.

References Cited

UNITED STATES PATENTS 2,782,133   2/1957   Vallette _____ 23—14 X

OTHER REFERENCES

Mellor: "Comprehensive Treatise on Inorganic and Theoretical Chemistry," 1928, vol. VIII, page 599.
Schmulbach: "Progress in Inorganic Chemistry," 1962, vol. 4, pp. 292, 301–302.

MILTON WEISSMAN, *Primary Examiner.*